United States Patent [19]

Goi et al.

[11] 4,222,587

[45] Sep. 16, 1980

[54] DRIVING DEVICE FOR A MOTOR CAR SEAT BELT

[75] Inventors: Yoshihiro Goi; Shozo Kamiharako, both of Okazaki, Japan

[73] Assignee: Mitsubishi Jidosha Kogyo Kabushiki Kaisha, Tokyo, Japan

[21] Appl. No.: 762

[22] Filed: Jan. 2, 1979

[30] Foreign Application Priority Data

Feb. 9, 1978 [JP] Japan .............................. 53-14443[U]
Nov. 28, 1978 [JP] Japan .............................. 53-146842

[51] Int. Cl.² ............................................. B60R 21/10
[52] U.S. Cl. .................................................... 280/804
[58] Field of Search ....................... 280/802, 803, 804; 297/469

[56] References Cited

U.S. PATENT DOCUMENTS

| 3,680,883 | 8/1972 | Keppel et al. | 280/803 |
| 3,754,776 | 8/1973 | Cataldo et al. | 280/803 |
| 3,831,971 | 8/1974 | Kaneko et al. | 280/802 |

Primary Examiner—Robert R. Song

Attorney, Agent, or Firm—Wenderoth, Lind & Ponack

[57] ABSTRACT

A driving device for a motor car seat belt which drives a seat belt supporting member such as an anchor, a ring, etc. in response to opening and closing of a door of a motor car, so that a motor car seat belt may be held in a restraining position for a person on a motor car when the door is fully closed, while being held in an unrestraining position when the door has been opened to a predetermined open angle position between the fully closed position and a fully opened position. The driving device for the seat belt supporting member is essentially composed of a rack that is movable in response to the opening and closing of the door and a pinion which meshes with the rack and is operatively coupled to the seat belt supporting member. Notched portions having no teeth are formed respectively on the rack and on the pinion so that the notched portion on the rack is opposite to the notched portion on the pinion when the door is opened beyond the predetermined opening angle position for stopping the pinion regardless of further movement of the rack.

15 Claims, 11 Drawing Figures

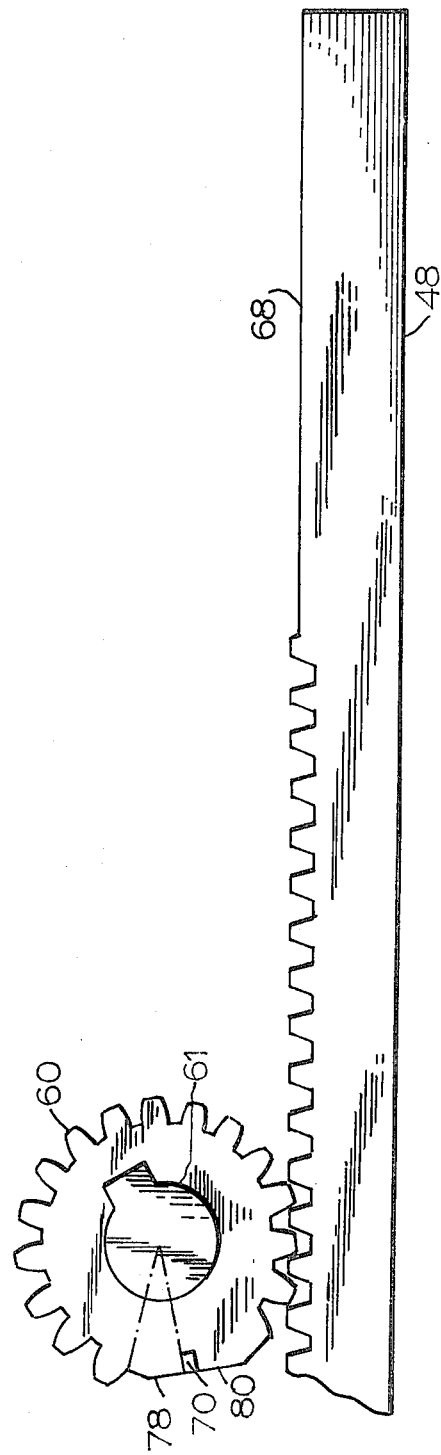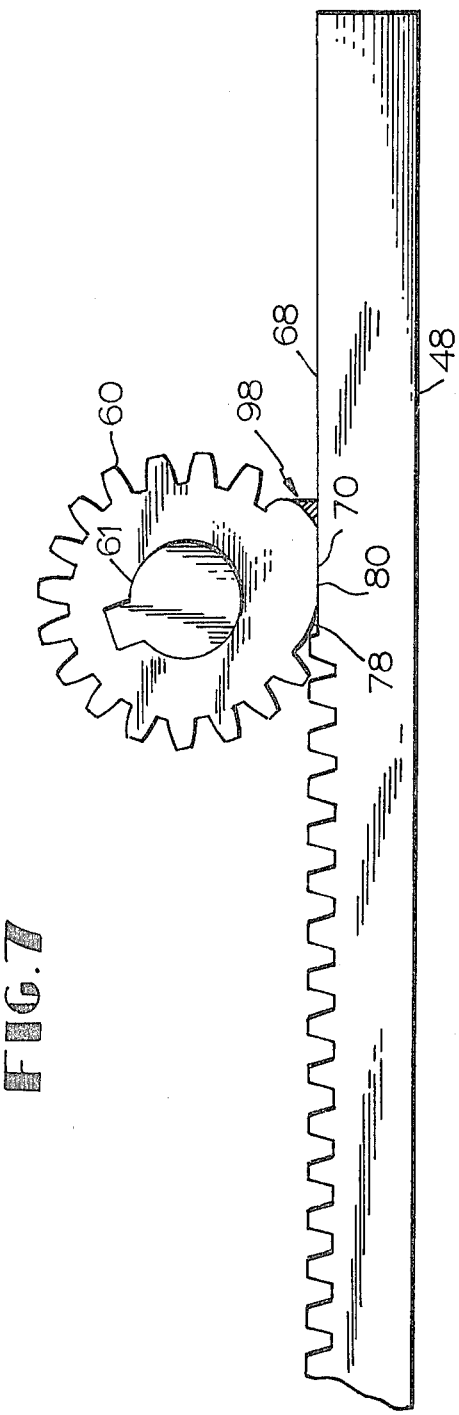

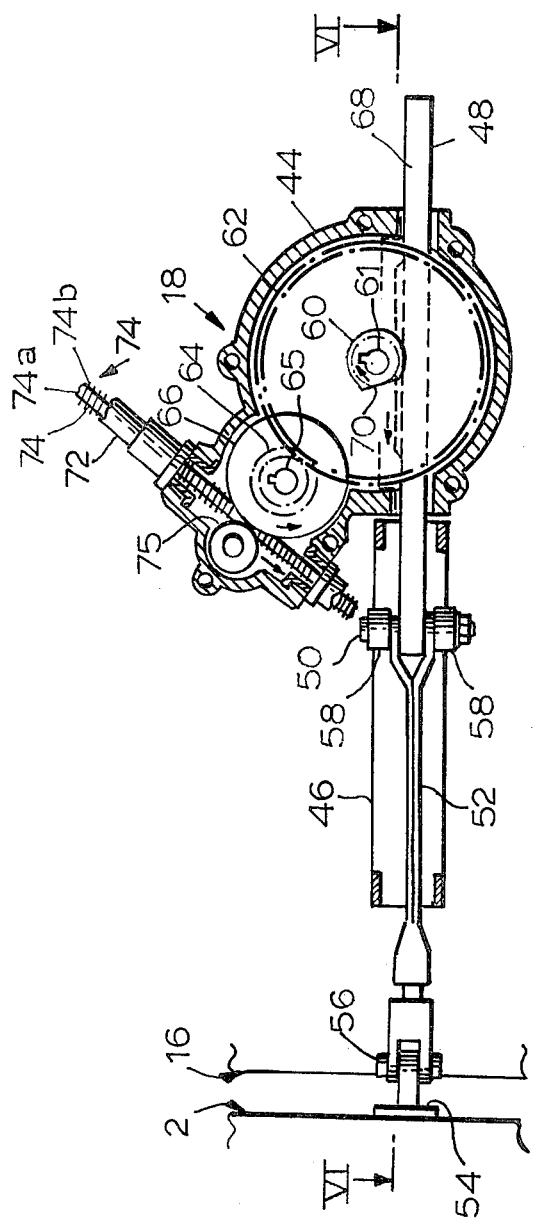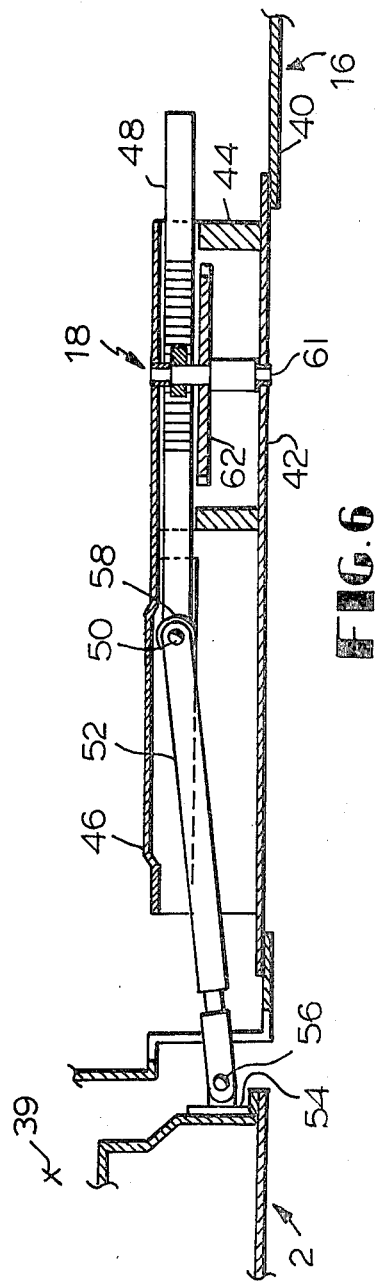
FIG.5
FIG.6

DRIVING DEVICE FOR A MOTOR CAR SEAT BELT

BACKGROUND OF THE INVENTION

The present invention relates to improvements in a driving device for a motor car seat belt.

A driving device for moving a seat belt supporting member in response to opening and closing of the door of a car is provided in a passive seat belt apparatus in which the supporting member such as an anchor, a ring, etc. for a seat belt is movably supported from a guide rail, a guide arm, or the like which is attached to a door or on a car body so that in response to opening and closing of the door, the seat belt supporting member is moved to an unrestraining position for enabling a person to get in or out of the car or is moved to a restraining position for restraining a person in the car.

However, heretofore known driving devices which mechanically respond to opening and closing of a door, have had a disadvantage in that since a seat belt supporting member is continuously moved according to the degree of opening of the door between a fully closed position and a fully opened position of the door, the seat belt supporting member was placed at a position between the restraining position and the unrestraining position, when the door was partially open which often occurs when getting in and out of a car, and thus the ease of getting in and out of a car is affected.

SUMMARY OF THE INVENTION

Therefore, it is one object of the present invention to provide a driving device for a motor car seat belt, which moves a seat belt supporting member to an unrestraining position for a person in a car in response to the opening of a door to a predetermined opening angle, whereby a person can easily get in and out of the car without the requirement of fully opening the door.

According to one feature of the present invention, there is provided a driving device for a motor car seat belt which comprises a rack which is slidably supported in its lengthwise direction from one of the doors and a car body which pivotably supports said door in a freely openable manner. There is a coupling means for coupling said rack and said door and said car body at a position at an angle to the pivotal axis of the pivotal movement of said door with respect to the car body, said coupling means allowing relative displacement between the lengthwise center line of the rack and the coupling position of which is caused by opening and closing of the door, a pinion is meshed with the rack and is pivotably supported from said one door and the car body, and a seat belt supporting member such as an anchor, a ring, etc. is operatively coupled to the pinion so that in response to relative displacement between said one door and the car body and the rack being acted upon by the opening and closing of the door, the motor car seat belt is moved to a restraining position for a person in the motor car when the door is at a fully closed position, while it is moved to an unrestraining position when the door is opened up to a predetermined opening angle position between the fully closed position and the fully opened position, there being notched portions on the rack and pinion having no teeth respectively thereon so that the notched portion on the rack may be opposite to the notched portion on the pinion when the door is opened beyond said predetermined opening angle position, whereby the pinion is stopped regardless of further movement of said rack.

The above-described and other features and objects of the present invention will become more apparent by reference to the following detailed description of the preferred embodiments taken in conjunction with the accompanying drawings, in which:

BRIEF DESCRIPTION OF THE DRAWINGS

FIG. 5 is an enlarged side view partly in cross-section of the driving device 18 which is shown in FIG. 4, FIG. 6 is an enlarged horizontal cross-section view taken along line VI—VI of FIG. 5 as viewed in the direction of the arrows, FIG. 7 is an enlarged schematic view showing the rack 48 and a pinion 60 in FIG. 5 in a meshed state, FIG. 8 is an enlarged schematic view showing the state where the notched portion 68 on the rack 48 is opposite to the notched portion 70 on the pinion 60.

DETAILED DESCRIPTION OF THE INVENTION

First, various types of passive seat belt apparatuses for motor cars to which the present invention is directed, will be explained with reference to FIGS. 1 to 3.

Figure 1:
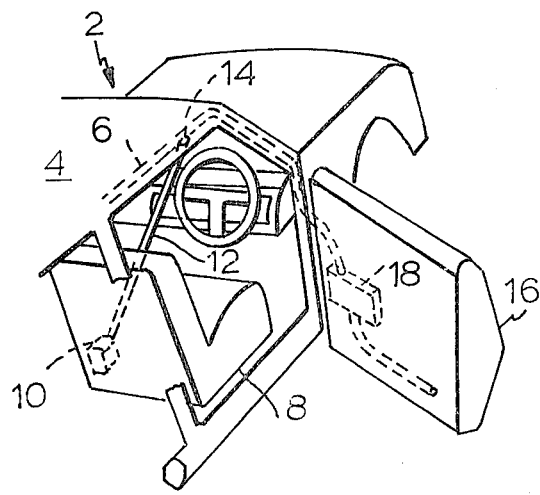
FIG. 1 is a perspective view showing one example of the passive seat belt apparatuses to which the present invention is directed.

In the seat belt apparatus shown in FIG. 1, a guide 6 which extends in a forward and backward direction in a car body 2 is provided on a roof rail which is located at a side portion of the roof panel 4 in the car body 2. An anchor 14, to which one end of a seat belt 12 is connected, is slidably mounted in the guide 6, the other end of the seat belt 12 is wound in a retractor 10 which is associated with an emergency locking mechanism, and positioned at a side portion of a seat 8, so that when a door 16 is opened, the anchor 14 is moved to a front portion of the guide 6 as shown in FIG. 1 by means of a driving device 18 which disposed in the door 16 to enable a person to get in and out of the car, whereas when the door 16 is closed, the anchor 14 is moved to a rear portion of the guide 6 so that the seat belt 12 restrains a person sitting on the seat 8.

Figure 2:
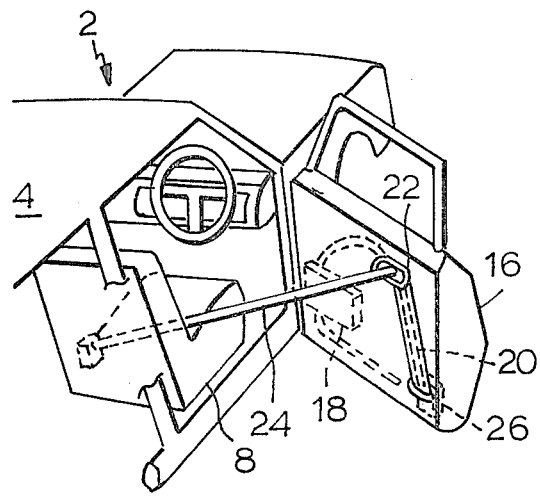
FIG. 2 is a perspective view showing another example of the passive seat belt apparatuses to which the present invention is also directed.
Figure 3:
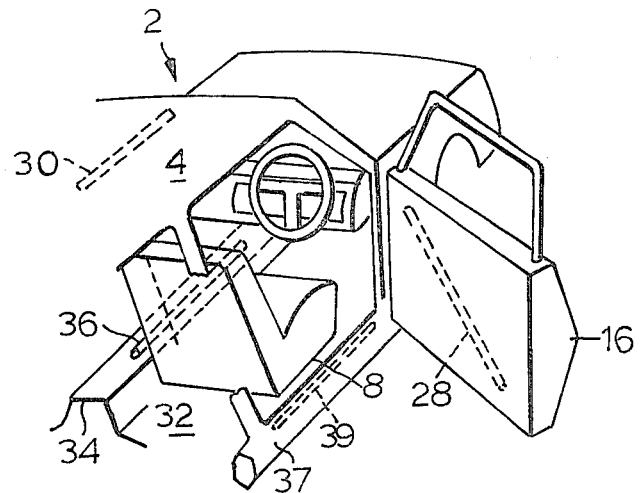
FIG. 3 is a perspective view showing further modifications of the passive seat belt apparatuses to which the present invention is directed.
Figure 9:
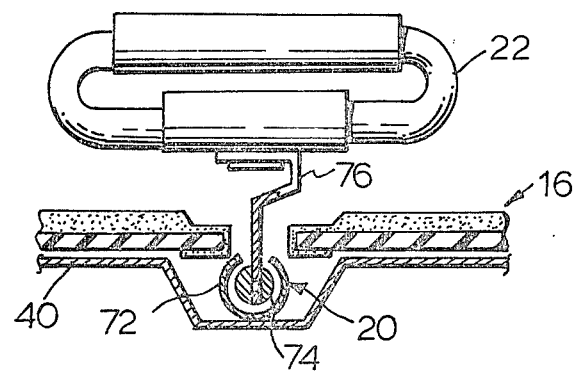
FIG. 9 is an enlarged cross-section view taken along line IX—IX of FIG. 4 as viewed in the direction of the arrows.

In the apparatus shown in FIG. 2, there is provided on a door 16 a guide 20, which extends from a rear lower portion the door 16 in an obliquely upward direction, a ring 22 is slidably mounted in the guide 20, one end of a seat belt 24 is connected to a side portion of a seat 8, the other end of the seat belt 24 is passed through the ring 22 and wound in a retractor 26 associated with an emergency locking mechanism and disposed in the door 16, so that when the door 16 is opened, the ring 22 is moved to an upper portion of the guide 20, as shown in FIG. 2, by means of a driving device 18, to enable a person to get in and out of the car, whereas when the door 16 is closed, the ring 20 is moved to a lower portion of the guide 20 so that the seat belt restrains a person sitting on the seat 8.

In addition, the present invention is also applicable to various modifications of the passive seat belt apparatuses illustrated in FIGS. 1 and 2 and described above, such that a seat belt supporting member, such as an anchor, a ring, or the like is slidable along a guide 28 which is disposed in a door 16 and extending from a rear lower portion of the door 16 to a front upper portion thereof, a guide 30 is disposed at a center portion of a roof panel 4, a guide 36 is disposed at a back raised portion 34 of a floor panel 32, or a guide 39 is disposed on a side sill 37. Alternatively, though not illustrated, it is also possible to fix a seat belt supporting member onto a guide arm that is rockingly mounted on a car body or a door, and to move the seat belt between a restraining position and an unrestraining position for a person on a motor car, by rocking the guide arm in response to opening and closing of the door.

Now a first preferred embodiment of the present invention as applied to the motor car seat belt apparatus of the type shown in FIG. 2 will be described with reference to FIGS. 4 through 9. In these figures, a door 16 is pivotally supported one a car body 2 by means of a hinge 38 in a freely openable manner, and a casing 44 and a guide 46 are fixedly secured onto a base plate 42 that is mounted on an inner panel 40 of the door 16. In the casing 44, a rack 48 is supported slidably in its lengthwise direction from the casing 44, and one end of the rack 48 is attached to one end of a link 52 by a pin 50. The other end of the link 52 is attached to a bracket 54 fixedly secured to the car body 2 by means of a pin 56 at a position laterally offset to the axis of rotation 39 of the door hinge 38. On the pin 50 for connecting the rack 48 to the link 52 are mounted rollers 58, which are adapted to be guided along a guide 46 in the same direction as the direction of sliding of the rack 48. In the casing 44, a shaft 61 is rotatably supported therefrom, and on the shaft 61 there is fixedly mounted a pinion 60 which is adapted to mesh with the rack 48. On this shaft 61 is fixedly mounted a gear 62 having a larger diameter than the pinion 60, and another shaft 65 on which another gear 64 having a smaller diameter than the gear 62 and adapted to mesh with the gear 62 is fixedly secured, is rotatably supported from this casing 44, and on this shaft 65 is fixedly mounted a driving wheel 66. On the rack 48 and the pinion 60 there are respectively notched portions 68 and 70 having no teeth thereon.

When the door 16 is opened, starting from the position shown in FIG. 7, the rack 48 is moved leftwards resulting in rotation of the pinion 60, and when the door 16 has reached a position at a predetermined opening angle between a fully closed position and a fully opened position, the position shown in FIG. 8 where the notched portions 68 and 70 are opposite to each other is realized, and therefore, even if the door 16 is further opened and the rack 48 is moved accordingly, the rotation of the pinion 60 is stopped.

Figure 4:
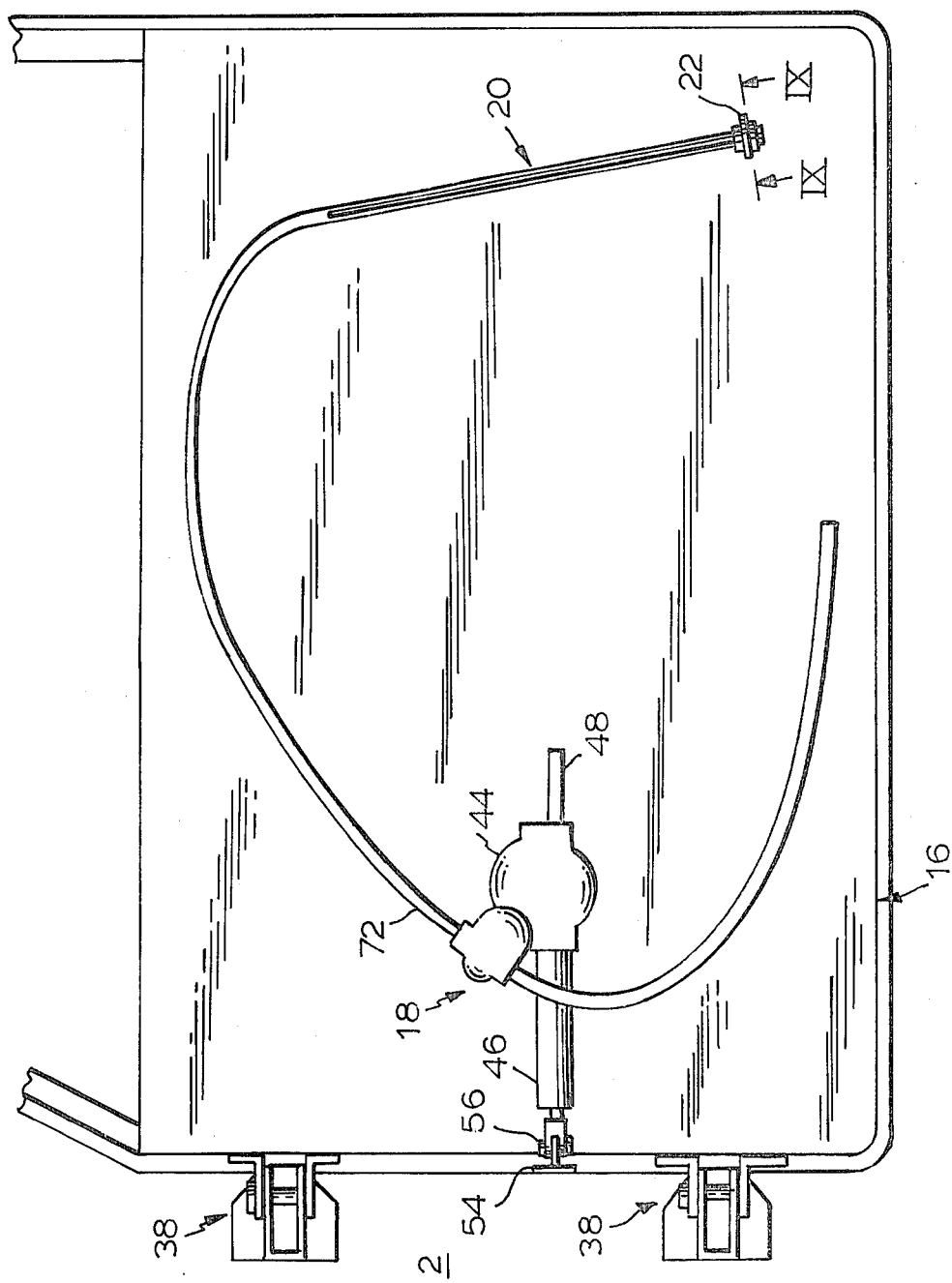
FIG. 4 is a side view showing a first preferred embodiment of the present invention.

In a tube 72 which is fixedly secured to the casing 44 is slidably inserted a cable 74. This cable 74 is composed of a core wire 74a having a thin wire 74b wound therearound in a spiral manner so as to be engaged with the driving wheel 66, and it is urged against the driving wheel 66 by an idle pulley 75 so that it may be moved in its lengthwise direction by the rotation of the driving wheel 66. With regard to the core wire 74a, it should preferably be a strand made of a plurality of wires, but alternatively, could be a single wire. The guide 20 is formed by extending the tube 72, fixing it onto the inner panel 40 of the door 16 and cutting a slit in it which opens towards a cabin and extends from a rear lower portion of the door 16 in an obliquely upward direction as shown in FIG. 4. A ring 22 is mounted on the cable 74 by a supporting member 76 as can be seen best in FIG. 9. In addition, the diameters of the pinion 60, gears 62 and 64 and driving wheel 66 are selected so that when the notched portion 68 on the rack 48 is opposite to the notched portion 70 on the pinion 60, the ring 22 moved by the cable 74 may be positioned at the upper end of the guide 20.

Accordingly, starting from the position shown in FIG. 4 where the door 16 is fully closed, if the door 16 is opened to the position of the previously described predetermined opening angle where the notched portion 68 on the rack 48 and the notched portion 70 on the pinion 60 are opposite to each other, then the ring 22 is positioned at the upper end of the guide 20, and even if the door 16 is further opened beyond the predetermined opening angle, the ring 22 is held stopped at the upper end of the guide 20. As described above, if the door 16 is opened at least up to the previously described predetermined opening angle, the through ring 22 is moved by the driving device 18 up to the upper end of the guide 20 and thereby the seat belt 24 is moved to a perfectly unrestraining position for a person sitting on the seat 8. Therefore, a person can easily get on and off a motor car without the necessity of the door 16 being fully open.

According to the above-described embodiment of the invention, since the driving device 18 is constructed in a manner such that a displacement of the rack 48 relative to the casing 44 will be transmitted to the driving wheel 66 via a booster gear assembly consisting of the pinion 60 and the gears 62 and 64, the extent of displacement of the rack 48 relative to the casing 44 caused by opening and closing of the door 16 can be selected to be a small amount, and accordingly, the connecting point of the link 52 to the car body 2 can be set near the pivotal axis 39 of the hinge 38, thereby resulting in a spatial advantage.

It is to be noted that while the notched portion 70 on the pinion 60 consists of an arcuate portion 78 along the pitch of a circle and a flat portion 80 along a tangent line to the arcuate portion 78 in the illustrated embodiment (FIG. 8), the respective notched portions 70 and 68 may have any configuration close to the aforedescribed shape.

In addition, while the driving device 18 is provided in the door 16 and the link 53 serving as the input terminal of the driving device 18 is connected to the car body 2 in the above-described embodiment, as a matter of course, the construction could be modified in an opposite manner such that the the driving device 18 is provided on the car body 2 and the link 52 is connected to the door 16 by any appropriate means.

Next, a second preferred embodiment of the present invention will be described in detail with reference to FIGS. 10 and 11. It is to be noted that in the second preferred embodiment, component parts which are substantially identical to those of the first preferred embodiment are given the same reference numerals as those used in the first preferred embodiment and a detailed description thereof will be omitted.

In this preferred embodiment, a rack 48 is slidably supported from a casing 44 and is connected by means of a pin 92 to a bracket 90 that is fixedly secured to a car body 2 at a position at an angle to a pivotal axis 39 of a hinge 38, and in said bracket 90 is located a guide slot 94 which extends in the forward and outward direction of the car body 2. The other component parts and arrangement thereof are exactly the same as those employed in the first preferred embodiment.

Figure 10:
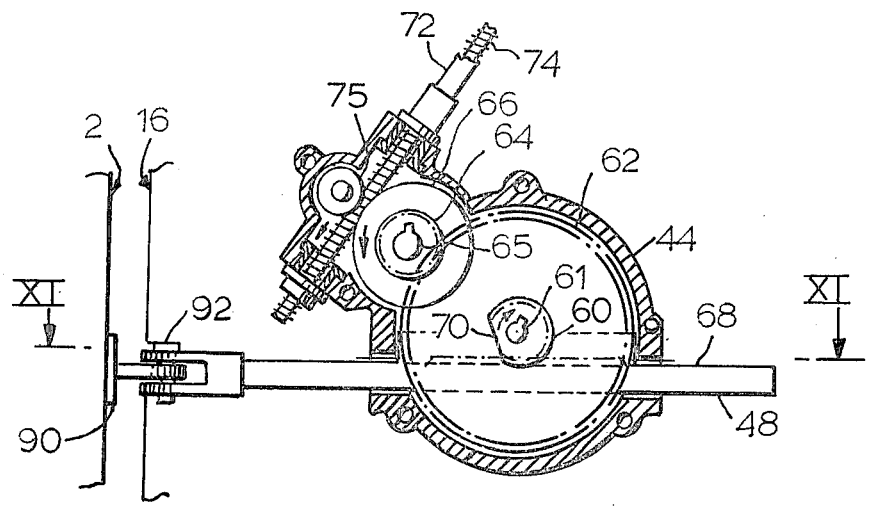
FIG. 10 is an enlarged side view partly in cross-section of a driving device according to a second preferred embodiment of the present invention.
Figure 11:
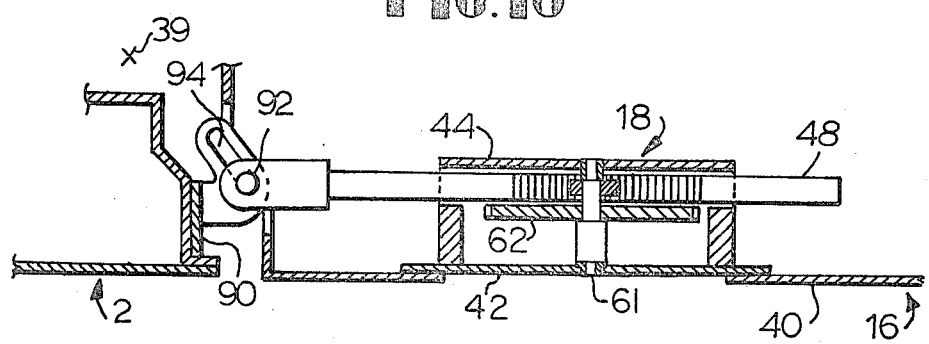
FIG. 11 is an enlarged horizontal cross-section view taken along line XI—XI of FIG. 10 as viewed in the direction of the arrows.

According to the previously described construction of the driving device, starting from the position shown in FIGS. 10 and 11, if the door 16 is opened to a position at a predetermined opening angle where the notched portion 68 on the rack 48 and the notched portion 70 on the pinion 60 are opposite to each other, then the ring 22 is positioned at the upper end of the guide 20, and even if the door 16 is further opened beyond the predetermined opening angle, the ring 22 is kept stopped at the upper end of the guide 20. Thus if the door 16 is opened at least up to the predetermined opening angle, the ring 22 is moved by the driving device 18 up to the upper end of the guide 20 and thereby the seat belt 24 is moved to a perfectly unrestraining position for a person sitting on the seat 8. Therefore, a person can easily get on and off a motor car without the necessity of fully opening the door 16.

In the described second preferred embodiment of the invention, while the driving device 18 is constructed in such manner that the guide slot 94 may extend in the forward and outward direction of the car body 2, in essence it is only necessary that the guide slot 94 should have such shape such that is does not prevent the rack 48 from sliding in its lengthwise direction when the door 16 is opened or closed.

Furthermore, in the second preferred embodiment also, as a matter of course, the construction of the seat belt apparatus could be modified in such manner that the driving device 18 is provided on the car body 2 and the bracket 90 is fixedly secured to the door 16.

In addition, it is to be noted that in either preferred embodiment of the present invention, if a protrusion 98 having a contour partly consisting of an extension of the flat portion 80 of the notched portion 70 on the pinion 60 is located on the pinion 60 as shown in FIG. 8, then even in the case of a small diameter of the pinion 60, the length of the flat portion 80 of the notched portion 70 can be such that the rotation of the pinion 60 can be surely stopped when the notched portion 70 on the pinion 60 and the notched portion 68 on the rack 48 are opposite to each other.

Since many changes could be made in the above construction and many apparently widely different embodiments of this invention could be made without departing from the scope thereof, it is intended that all the matter contained in the above description or shown in the accompanying drawings shall be interpreted as having illustrative only and not in a limiting sense.

What is claimed is:

1. A driving device for a seat belt for a vehicle, said driving device comprising:
    a rack which is slidably supported along its length on one of the vehicle body and a door pivotally supported on the vehicle for being freely opened and closed;
    coupling means on said rack for coupling said rack to the other of the vehicle body and the door, said rack being laterally offset from the pivotal axis of pivotal movement of the door with respect to the vehicle body for causing relative displacement of said rack along its length when said door is opened and closed;
    a rotatable pinion which meshes with said rack; and
    a seat belt supporting member coupled to said pinion for moving from a restraining condition when said door is closed to a non-restraining condition when said door has been opened to a predetermined angle, said rack and said pinion having notched portions thereon wherein there are no teeth which mesh thereby stopping rotation of said pinion regardless of further movement of said rack when said respective notched portions are opposite to each other, said predetermined angle corresponding to the position wherein said notched portions first oppose each other.

2. A driving device as claimed in claim 1 wherein said seat belt supporting member is an anchor.

3. A driving device as claimed in claim 1 wherein said seat belt supporting member is a ring.

4. A driving device as claimed in claim 1 in which said coupling means comprises:
    a link having one end connected to said rack and the other end connected to the other of the vehicle body and the door.

5. A driving device as claimed in claim 4 wherein said coupling means further comprises:
    a roller mounted on a pin for coupling said rack with said link, said roller being adapted for being guided, said driving device further having a guide member disposed on the other of the vehicle body and the door for guiding said roller, said guide member extending in the same direction as the direction of sliding of said rack.

6. A driving device as claimed in claim 1 further comprising a speed-up gear for operatively coupling said pinion to said seat belt supporting member.

7. A driving device as claimed in claim 8 further having a cable and a driving wheel, said seat belt supporting member being connected to said cable, and said cable being driven by said driving wheel, and said driving wheel being operatively coupled to said speed-up gear.

8. A driving device as claimed in claim 7 in which said cable comprises a core wire and a thin wire wound around said core wire in spiral form, said driving wheel having transverse grooves on the outer periphery thereof, and said driving device further comprising a limiting member which abuts against said cable for engaging with said transverse grooves.

9. A driving device as claimed in claim 8 in which said limiting member comprises an idle pulley.

10. A driving device as claimed in claim 1 further comprising a casing mounted on said one of said door and vehicle body wherein said rack is supported slidably along its length in said casing, and said pinion is rotatably mounted in said casing.

11. A driving device as claimed in claim 10 further having a speed-up gear whereby said seat belt supporting member is operatively coupled to said pinion by said speed-up gear and said speed-up gear is rotatably mounted in said casing.

12. A driving device as claimed in claim 11 further comprising a cable and a driving wheel for driving said cable, said seat belt supporting member being connected to said cable, and said cable being operatively coupled to said speed-up gear.

13. A driving device as claimed in claim 8 further comprising a casing mounted on said one of said door and vehicle body wherein said rack is supported slidably along its length in said casing and wherein said limiting member is disposed in said casing.

14. A driving device as claimed in claim 13 wherein said limiting member comprises an idle pulley which is rotatably supported in said casing.

15. A driving device as claimed in claim 1 wherein said coupling means comprises:
a pin, a bracket fixedly mounted on said one of said door and vehicle body, said pin coupling said rack to said bracket, and a guide slot located in one of said rack and said bracket for guiding said pin in a direction at a right angle to the axis of said pin.

* * * * *